United States Patent
Kawano et al.

(10) Patent No.: US 7,912,267 B2
(45) Date of Patent: Mar. 22, 2011

(54) VIRTUAL-SLIDE SPECIMEN IMAGE ACQUISITION APPARATUS

(75) Inventors: Yoshihiro Kawano, Tokyo (JP); Mitsumori Hayashida, Tokyo (JP); Keiji Kimura, Tokyo (JP); Iwao Kanamori, Kanagawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/620,268

(22) Filed: Nov. 17, 2009

(65) Prior Publication Data
US 2010/0128962 A1  May 27, 2010

(30) Foreign Application Priority Data
Nov. 26, 2008  (JP) .................................. 2008-300680

(51) Int. Cl.
*G06K 9/00* (2006.01)
(52) U.S. Cl. ............................ 382/128; 128/922; 377/10
(58) Field of Classification Search .................. 382/100, 382/128, 129, 133, 134; 377/10, 11; 128/922; 356/39
See application file for complete search history.

(56) References Cited

U.S. PATENT DOCUMENTS

| | | | |
|---|---|---|---|
| 6,272,235 B1 * | 8/2001 | Bacus et al. | 382/133 |
| 6,711,283 B1 * | 3/2004 | Soenksen | 382/133 |
| 7,756,305 B2 * | 7/2010 | Price | 382/128 |
| 2009/0074284 A1 * | 3/2009 | Zeineh et al. | 382/133 |

FOREIGN PATENT DOCUMENTS

| | | |
|---|---|---|
| JP | 2001-519944 A | 10/2001 |
| JP | 2003-248176 A | 9/2003 |
| JP | 2006-292999 A | 10/2006 |

* cited by examiner

*Primary Examiner* — Anand Bhatnagar

(57) ABSTRACT

The present invention is a virtual-slide specimen image acquisition apparatus that captures images by dividing a specimen into a plurality of sections, having a conveying device in which a plurality of specimens can be arranged and that conveys the plurality of the arranged specimens in a first direction by a distance corresponding to the length of a side along the first direction in one of the divided sections and at first time intervals and an image capturing device that has an image capturing portion for capturing images of the specimens magnified at a predetermined magnification and that scans the specimens conveyed to a predetermined position in a second direction, by a predetermined length at second time intervals, such that the image capturing portion captures images of all of the sections that are positioned identically in the first direction and that are positioned differently in the second direction perpendicular to the first direction.

17 Claims, 9 Drawing Sheets

FIG. 3

| KEY INFORMATION | IMAGE |
|---|---|
| $X_{11}, Y_{11}-Y_{16}$ | IMAGE OF SECTION AT $(X_{11}, Y_{11}-Y_{16})$ |
| $X_{11}, Y_{21}-Y_{26}$ | IMAGE OF SECTION AT $(X_{11}, Y_{21}-Y_{26})$ |
| $X_{11}, Y_{31}-Y_{36}$ | IMAGE OF SECTION AT $(X_{11}, Y_{31}-Y_{36})$ |
| $X_{11}, Y_{41}-Y_{46}$ | IMAGE OF SECTION AT $(X_{11}, Y_{41}-Y_{46})$ |
| $X_{12}, Y_{11}-Y_{16}$ | IMAGE OF SECTION AT $(X_{12}, Y_{11}-Y_{16})$ |
| ⋮ | ⋮ |
| $X_{12}, Y_{41}-Y_{46}$ | IMAGE OF SECTION AT $(X_{12}, Y_{41}-Y_{46})$ |
| ⋮ | ⋮ |
| $X_{16}, Y_{11}-Y_{16}$ | IMAGE OF SECTION AT $(X_{16}, Y_{11}-Y_{16})$ |
| ⋮ | ⋮ |
| $X_{16}, Y_{41}-Y_{46}$ | IMAGE OF SECTION AT $(X_{16}, Y_{41}-Y_{46})$ |
| $X_{21}, Y_{11}-Y_{16}$ | IMAGE OF SECTION AT $(X_{21}, Y_{11}-Y_{16})$ |
| ⋮ | ⋮ |
| $X_{21}, Y_{41}-Y_{46}$ | IMAGE OF SECTION AT $(X_{21}, Y_{41}-Y_{46})$ |
| ⋮ | ⋮ |
| $X_{26}, Y_{11}-Y_{16}$ | IMAGE OF SECTION AT $(X_{26}, Y_{11}-Y_{16})$ |
| ⋮ | ⋮ |
| $X_{26}, Y_{41}-Y_{46}$ | IMAGE OF SECTION AT $(X_{26}, Y_{41}-Y_{46})$ |
| ⋮ | ⋮ |
| $X_{n1}, Y_{11}-Y_{16}$ | IMAGE OF SECTION AT $(X_{n1}, Y_{11}-Y_{16})$ |
| ⋮ | ⋮ |
| $X_{n1}, Y_{41}-Y_{46}$ | IMAGE OF SECTION AT $(X_{n1}, Y_{41}-Y_{46})$ |
| ⋮ | ⋮ |
| $X_{n6}, Y_{11}-Y_{16}$ | IMAGE OF SECTION AT $(X_{n6}, Y_{11}-Y_{16})$ |
| ⋮ | ⋮ |
| $X_{n6}, Y_{41}-Y_{46}$ | IMAGE OF SECTION AT $(X_{n6}, Y_{41}-Y_{46})$ |

5b

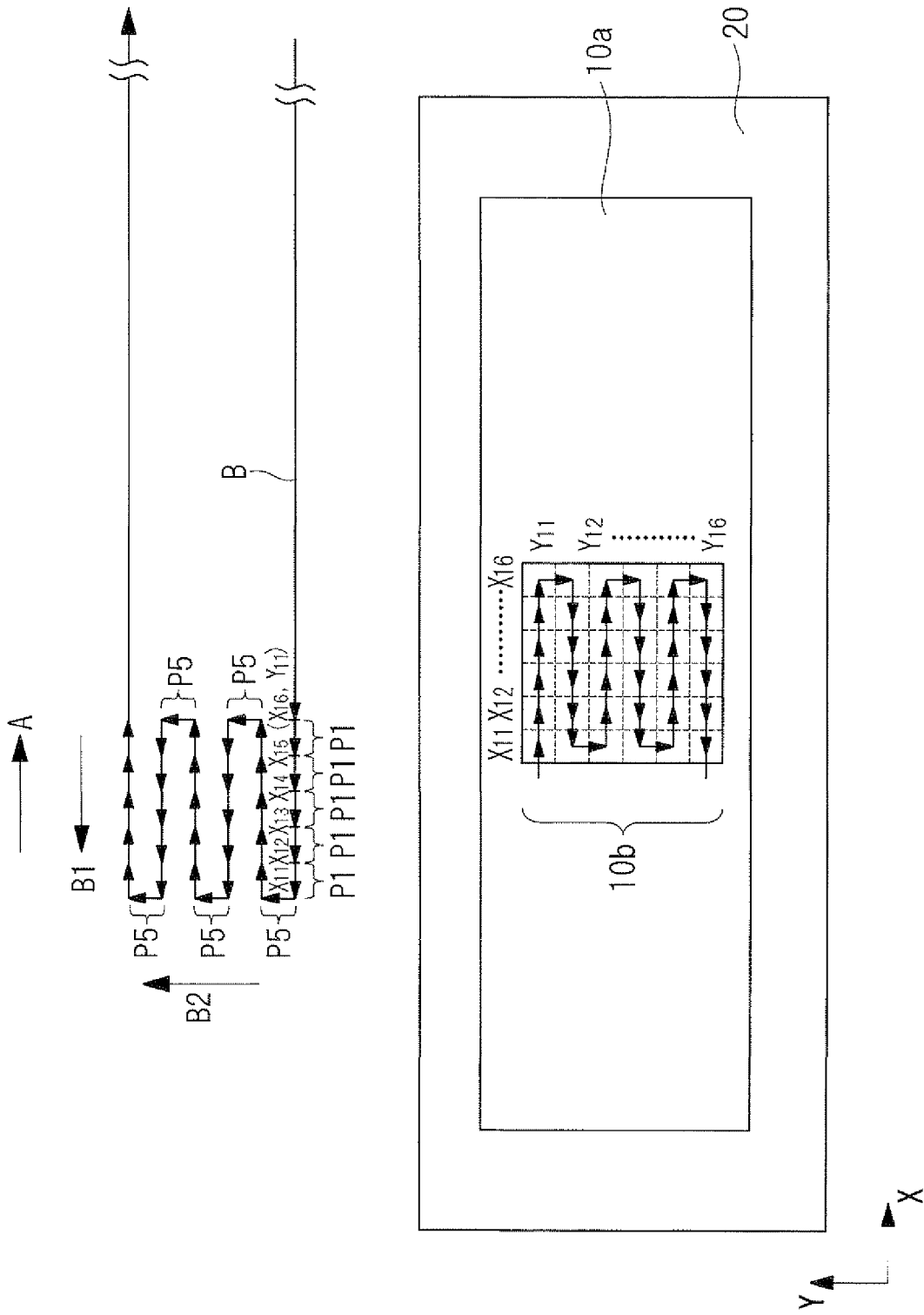

FIG. 4B
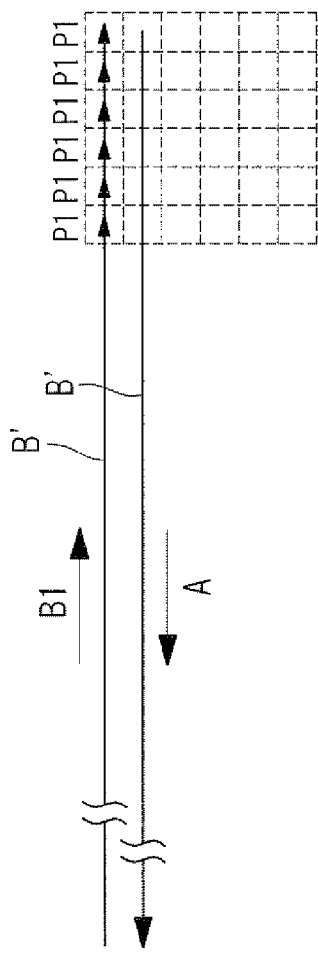
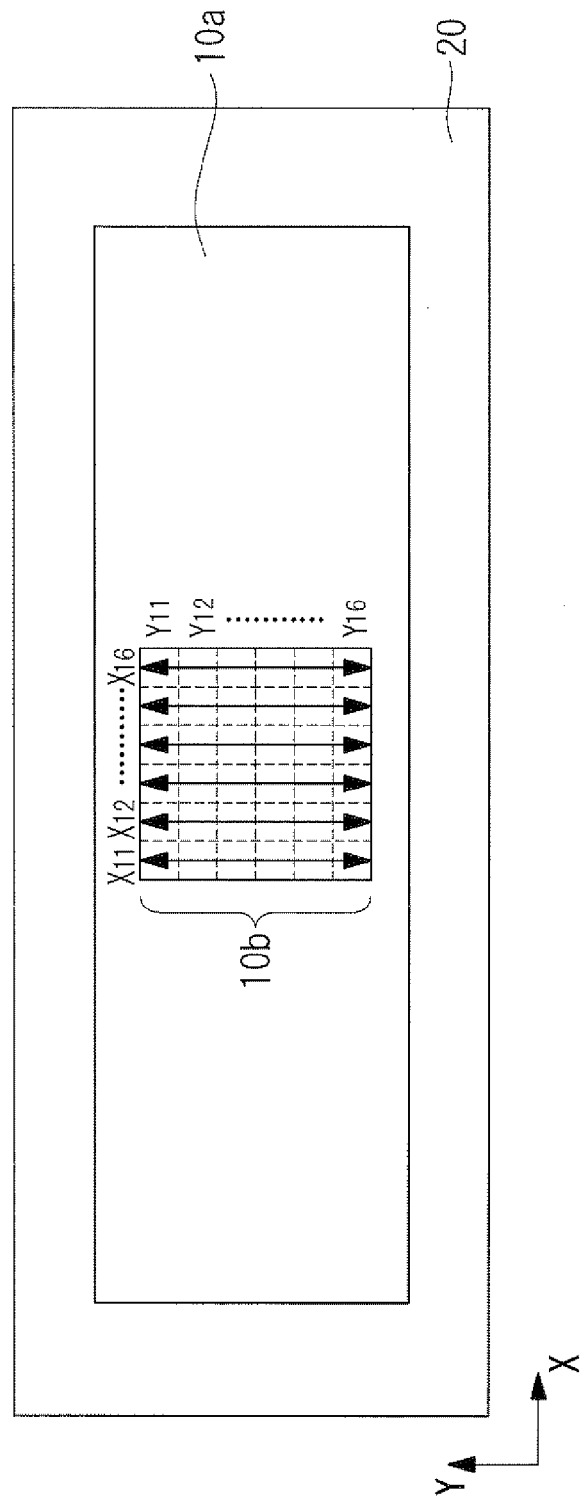

FIG. 6

| KEY INFORMATION | IMAGE |
|---|---|
| $X_{11}, Y_{11}$ | IMAGE OF SECTION AT $(X_{11}, Y_{11})$ |
| : | : |
| $X_{16}, Y_{11}$ | IMAGE OF SECTION AT $(X_{16}, Y_{11})$ |
| $X_{21}, Y_{11}$ | IMAGE OF SECTION AT $(X_{21}, Y_{11})$ |
| : | : |
| $X_{26}, Y_{11}$ | IMAGE OF SECTION AT $(X_{26}, Y_{11})$ |
| : | : |
| $X_{n6}, Y_{11}$ | IMAGE OF SECTION AT $(X_{n6}, Y_{11})$ |
| $X_{11}, Y_{12}$ | IMAGE OF SECTION AT $(X_{11}, Y_{12})$ |
| : | : |
| $X_{16}, Y_{12}$ | IMAGE OF SECTION AT $(X_{16}, Y_{12})$ |
| $X_{21}, Y_{12}$ | IMAGE OF SECTION AT $(X_{21}, Y_{12})$ |
| : | : |
| $X_{26}, Y_{12}$ | IMAGE OF SECTION AT $(X_{26}, Y_{12})$ |
| : | : |
| $X_{n6}, Y_{12}$ | IMAGE OF SECTION AT $(X_{n6}, Y_{12})$ |
| : | : |
| $X_{11}, Y_{16}$ | IMAGE OF SECTION AT $(X_{11}, Y_{16})$ |
| : | : |
| $X_{n6}, Y_{16}$ | IMAGE OF SECTION AT $(X_{n6}, Y_{16})$ |
| $X_{11}, Y_{21}$ | IMAGE OF SECTION AT $(X_{11}, Y_{21})$ |
| : | : |
| $X_{n6}, Y_{26}$ | IMAGE OF SECTION AT $(X_{n6}, Y_{26})$ |
| $X_{11}, Y_{31}$ | IMAGE OF SECTION AT $(X_{11}, Y_{31})$ |
| : | : |
| $X_{n6}, Y_{36}$ | IMAGE OF SECTION AT $(X_{n6}, Y_{36})$ |
| $X_{11}, Y_{41}$ | IMAGE OF SECTION AT $(X_{n1}, Y_{41})$ |
| : | : |
| $X_{n6}, Y_{46}$ | IMAGE OF SECTION AT $(X_{n6}, Y_{46})$ |

5b

VIRTUAL-SLIDE SPECIMEN IMAGE ACQUISITION APPARATUS

BACKGROUND OF THE INVENTION

1. Field of the Invention

The present invention relates to apparatuses that acquire specimen images for virtual slides.

This application is based on Japanese Patent Application No. 2008-300680, the content of which is incorporated herein by reference.

2. Description of Related Art

In a conventionally employed method of specimen observation by a pathologist, etc., using an optical microscope, for example, a site in need of diagnosis is searched for by moving a stage (or a specimen on the stage) while observing the entire image of the specimen using a low-magnification objective lens, having a magnification of ×10 and an NA of about 0.4 or a magnification of ×20 and an NA of about 0.7 to 0.8; subsequently, detailed observation is conducted by magnifying the site by switching to a high-magnification objective lens having a magnification of ×40 and an NA of about 0.85 to 0.95.

However, in order to observe the site in need of diagnosis, the stage (or the specimen on the stage) is moved every time, and objective lenses are switched to change or to magnify the observation viewing field, thereby making operation tediously complicated. In addition, when sites needing diagnosis are dispersed in multiple locations in a specimen, it is difficult to ascertain relative positions at individual sites with respect to the entire region of the specimen, thus requiring considerable effort in confirming a pathological change.

In addition, if a pathologist were to, using an optical microscope, divide a specimen into a plurality of finely-divided sections, capture magnified images of individual sections, and then, paste those images together, in order to ascertain positions of individual sites with respect to the entire region of a specimen, enormous time and effort would be required, and consequently, a large number of diagnoses cannot be carried out, and a patient awaiting results of diagnosis may even suffer undesirable effects.

In addition, while a lack of doctors, etc. is becoming an issue, there are many mid- and small-sized hospitals, medical facilities in remote locations, etc. without a pathologist. Furthermore, there are particular/special and rare pathological changes whose diagnosis is difficult unless done by a pathologist who specializes in the field. In such cases, a specimen on a slide glass needs to be shipped in order to request diagnosis by a pathologist, and thus, acquiring diagnosis results requires several days.

Meanwhile, in recent years, a virtual slide production system has been proposed, which enables virtual microscope observation by capturing and accumulating specimens on slide glasses as high-resolution digital images and by displaying the accumulated digital images of the specimens on a display device such as a computer, etc. at various magnifications and observation positions.

In general, a virtual slide production system is configured to have a microscope provided with an illumination optical system, an image capturing device, and a stage that holds a specimen and that is movable in predetermined directions; a control device that performs overall control, including operating control of the above-mentioned components; and a storage device that stores digital images captured by the image capturing device. The control device finely divides an observation region of the specimen on the slide glass into fine-scale regions in accordance with the magnification, causes the image capturing device to capture images of the finely-divided regions by successively scanning the regions while moving the stage, and causes the storage device to store the images while adding positional information of the captured individual regions relative to the entire image region. In addition, in individual regions, images focused at each predetermined depth of the specimen are captured. In this way, with a virtual slide production system, three-dimensional images of regions of a specimen are captured at each predetermined magnification and are stored as digital images.

The digital images generated by the virtual slide production system can be displayed, via a virtual slide displaying system, on a display screen of a networked computer of a pathologist, showing a desired observation site at a desired magnification.

Accordingly, with a virtual slide system, in addition to not requiring tediously complicated operations as in the conventional pathological diagnosis using an optical microscope, it is possible to simplify the operation of confirming pathological changes and to shorten the time required therefor. Furthermore, because virtual slides are digital data, the digital image data of specimens can be immediately sent to a pathologist even from a remote location, and therefore, it is possible to quickly obtain diagnosis results from the pathologist.

Additionally, digital images of specimens can be shared. Accordingly, it is possible to have a plurality of pathologists simultaneously perform observation and diagnosis of the same specimen. Also, by using virtual slides as learning materials, etc. for medical students, time and effort required for individually producing slide glass specimens can be reduced and learning materials can also be standardized.

Additionally, by using virtual slides, pathological diagnosis results can be explained to a patent while displaying images of specimens on a display device.

Meanwhile, conventionally known virtual slide apparatuses in which specimen images are automatically acquired from a plurality of samples (slide glasses) via a slide loader include, for example, those disclosed in Japanese Unexamined Patent Application, Publication No. 2006-292999, Japanese Unexamined Patent Application, Publication No. 2003-248176, Japanese Translation of PCT International Application, Publication No. 2001-519944, and Non-patent Document, "Virtual Slide System, Microscope Remote Observation System, MIRAX Family", Product Catalog of Carl Zeiss Microimaging GmbH.

In these apparatuses, a slide glass specimen (or a slide glass specimen loaded in a slide holder) is selected from a slide glass tray and is set on a stage via a slide loader, and the stage is moved to a predetermined image capturing position. Alternatively, a slide glass specimen (or a slide glass specimen loaded in a slide holder) is selected from a slide glass tray and is moved to a predetermined image capturing position via a stage that also functions as the slide loader. Subsequently, at the image capturing position, specimen images of individual finely-divided sections are captured via the image capturing device, for each slide glass specimen, by moving the stage in the x-y directions. By moving the stage in a predetermined direction upon completing image capturing of all sections, the slide glass specimen (or the slide glass specimen loaded in the slide holder) is returned to the same slide glass tray or stored in another slide glass tray.

BRIEF SUMMARY OF THE INVENTION

The present invention is a virtual-slide specimen image acquisition apparatus that captures images of a specimen by dividing specimen into a plurality of sections, including a conveying device in which a plurality of specimens can be arranged and that conveys the plurality of the arranged specimens in a first direction by a distance corresponding to the length of a side along the first direction in one of the divided sections and at first time intervals and an image capturing device that has an image capturing portion for capturing images of the specimens magnified at a predetermined magnification and that scans the specimens conveyed to a predetermined position in a second direction, by a predetermined length and at second time intervals, such that the image capturing portion captures images of all sections that are positioned identically in the first direction and that are positioned differently in the second direction perpendicular to the first direction.

BRIEF DESCRIPTION OF THE SEVERAL VIEWS OF THE DRAWINGS

FIG. 3 is an explanatory diagram showing the data arrangement of positional information of sections and images sections that are captured via the virtual-slide specimen image acquisition apparatus of the first embodiment and stored in an image storing device.

FIG. 4A is an explanatory diagram showing an example of the conveying operation and scanning regions in image acquisition processing of slide glass specimens in a conventional virtual-slide specimen image acquisition apparatus according to a Comparative Example of the present invention and is a diagram showing an example of the conveying operation and scanning regions in image acquisition processing with an area sensor camera.

FIG. 4B is an explanatory diagram showing an example of the conveying operation and scanning regions in image acquisition processing of slide glass specimens in a conventional virtual-slide specimen image acquisition apparatus according to a Comparative Example of the present invention and is a diagram showing an example of the conveying operation and scanning regions in the image acquisition processing with a line sensor camera.

FIG. 6 is an explanatory diagram showing the conveying operation and scanning regions in image acquisition processing of slide glass specimens using the virtual-slide specimen image acquisition apparatus of the second embodiment.

DETAILED DESCRIPTION OF THE INVENTION

Figure 1A:
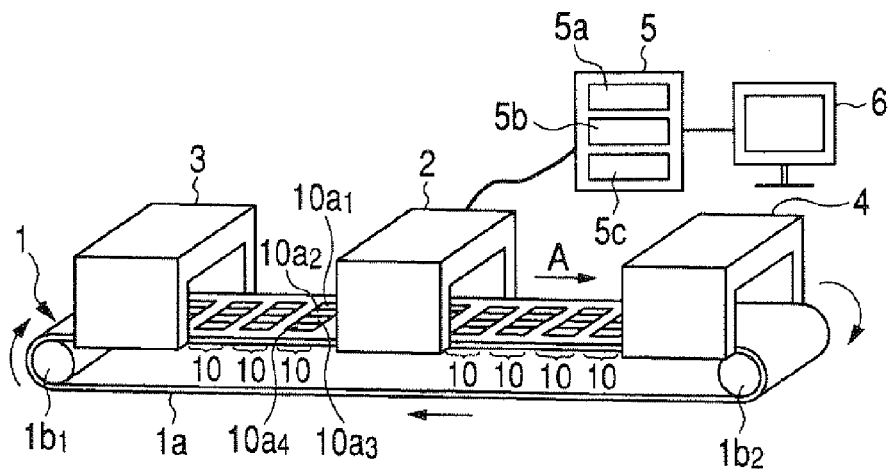
FIG. 1A is an explanatory diagram showing, in outline, the configuration of a virtual-slide specimen image acquisition apparatus according to a first embodiment of the present invention and is a perspective view of the configuration of the main portions thereof.

A virtual-slide specimen image acquisition apparatus according to an aspect of the present invention is a virtual-slide specimen image acquisition apparatus that has a conveying device for conveying specimens and an image capturing device including an image capturing portion capturing images of specimens magnified to a predetermined magnification, and that captures images of the specimen by dividing it into a plurality of sections using the conveying device and the image capturing device. The conveying device is configured such that a plurality of specimens can be one-dimensionally or two-dimensionally arranged thereon, and the arranged specimens are conveyed in a first direction at first time intervals for every length corresponding to the length of a side, parallel to the first direction, of one of the divided sections. Furthermore, the image capturing device has a scanning portion that scans the image capturing portion at second time intervals by a predetermined length in a second direction perpendicular to the first direction, so that images of the specimens conveyed to a predetermined position can be captured in all sections that are positioned identically in the first direction and that are positioned differently in the second direction, using the image capturing portion.

With this configuration, when acquiring images of a plurality of slide glass specimens, the number of times the conveying direction is switched in the conveying device can be reduced as much as possible, and the image acquisition processing for each slide glass specimen can be accelerated; therefore, the time required for image acquisition processing of a large number of slide glass specimens can be considerably shortened.

With the virtual-slide specimen image acquisition apparatus according to an aspect of the present invention, the conveying device is configured such that a plurality of specimens can be arranged thereon in the second direction, and the scanning portion scans the specimens conveyed to the predetermined position such that the image capturing portion can simultaneously capture images of all sections that are positioned identically in the first direction and that are positioned differently in the second direction.

With this configuration, by employing a line sensor camera in the image capturing portion, coupled with conveying with the conveying device in the first direction, the number of times the conveying direction is switched in the conveying device can be reduced as much as possible when acquiring images of a plurality of slide glass specimens. In addition, by arranging a plurality of slide glass specimens in the second direction and by simultaneously capturing images of a plurality of the slide glass specimens arranged in the second direction, the image capturing time required for acquiring images of all sections of the specimens can be shortened. As a result, image acquisition processing for each slide glass specimen can be accelerated, and the time required for image acquisition processing of a large number of slide glass specimens can be considerably shortened.

With the virtual-slide specimen image acquisition apparatus according to an aspect of the present invention, it is preferable that the conveying device be configured such that a plurality of specimens can be additionally arranged in the first direction.

With this configuration, image acquisition processing can be carried out for a large number of slide glass specimens. In addition, because additional specimen groups are arranged in the first direction, it is possible to achieve a cumulative effect of shortening the time required for image acquisition processing when acquiring images of all sections of a plurality of specimens arranged in the second direction. As a result, the time required for image acquisition processing of a large number of slide glass specimens can be considerably shortened.

With the virtual-slide specimen image acquisition apparatus according to an aspect of the present invention, it is preferable that the conveying device be configured so as to circulate to be conveyable in the first direction.

With this configuration, loaders for loading and unloading slide glass specimens are disposed in the conveying path of the conveying device. Accordingly, slide glass specimens can be loaded on the conveying device before image acquisition processing, and the slide glass specimens can be unloaded from the conveying device after image acquisition processing, without switching the conveying direction of the conveying device. As a result, the time required for image acquisition processing of a large number of slide glass specimens can be shortened even further.

With the virtual-slide specimen image acquisition apparatus according to an aspect of the present invention, it is preferable that the conveying device be composed of a belt conveyer having a circular belt and two conveying shafts for conveying the circular belt.

With this configuration, the space required for installing the conveying device can be reduced, and the size of the entire virtual-slide specimen image acquisition apparatus can be reduced.

In this case, it is preferable that the circular belt be provided with holding portions for holding the specimens.

By doing so, the slide glass specimens can be disposed on the entire circumference of the circular belt, thereby considerably increasing the number of specimens to be processed; therefore, image acquisition processing can be carried out more efficiently.

With the virtual-slide specimen image acquisition apparatus according to an aspect of the present invention, the conveying device is configured such that a plurality of specimens can be arranged in the first direction and so as to be circulate to be conveyable in the first direction; the scanning portion may be configured such that, after images of all sections that are positioned identically in the second direction and that are positioned differently in the first direction in the specimens conveyed to the predetermined position are captured by the image capturing device, the relative positions of the image capturing device and the conveying device are moved towards the next section located in the second direction, and this action is repeated until images of all sections of all specimens arranged on the conveying device are captured by the image capturing device.

With this configuration, a plurality of the slide glass specimens can be arranged in the first direction and images of the specimens arranged in the first direction can be simultaneously captured. Accordingly, the number of times the conveying direction is switched for acquiring images of all sections of the specimens can be reduced as much as possible, and image acquisition processing for each slide glass specimen can be accelerated. As a result, the time required for image acquisition processing of a large number of the slide glass specimens can be considerably shortened.

Here, the first direction is the conveying direction of the conveying device, and the conveying device is easily extended in the conveying direction. Accordingly, because a large number of the slide glass specimens are arranged in the conveying direction, it is possible to achieve a cumulative effect of shortening the time required for the image acquisition processing, when acquiring images of all sections of the specimens.

With the virtual-slide specimen image acquisition apparatus according an aspect of the present invention, it is preferable that the conveying device be configured such that a plurality of the specimens can be additionally arranged in the second direction.

With this configuration, image acquisition processing can be carried out for a large number of the slide glass specimens. In addition, because additional specimen groups are arranged in the second direction, it is possible to achieve a cumulative effect of shortening the time required for image acquisition processing, when acquiring images of all sections of a plurality of the specimens arranged in the first direction. As a result, the time required for the image acquisition processing of a large number of slide glass specimens can be considerably shortened.

With the virtual-slide specimen image acquisition apparatus according to an aspect of the present invention, it is preferable that the conveying device be composed of a conveyer belt provided with a circular belt having holding portions for holding the specimens and two conveying shafts for conveying the circular belt.

With this configuration, the space required for installing the conveying device can be reduced, and the size of the entire virtual-slide specimen image acquisition apparatus can be reduced.

In addition, if the circular belt is provided with the holding portions, the conveying device can be circulated without detaching the slide glass specimens from the circular belt.

With the virtual-slide specimen image acquisition apparatus according to an aspect of the present invention, the circular belt may be configured to be detachable from the conveying device.

By doing so, multiple sets of circular belts holding the slide glass specimens in holding portions can be prepared, and the whole belt can be exchanged upon completing image acquisition processing of all slide glass specimens on the circular belt. Accordingly, a loader for loading or unloading the slide glass specimens need not be provided.

With the virtual-slide specimen image acquisition apparatus according to an aspect of the present invention, the conveying device may be composed of an annular member that rotates on a horizontal plane in one rotational direction.

With this configuration, the conveying device can be circulated without providing the conveying device with the holding portions for holding the slide glass specimens. In addition, for loading and unloading the slide glass specimens, it is adequate to dispose a single loader, which assumes both the function of loading the slide glass specimens on the conveying path and the function of unloading the slide glass specimens from the conveying path, in the conveying path of the conveying device; therefore, the overall configuration of the virtual-slide specimen image acquisition apparatus can be simplified.

With the virtual-slide specimen image acquisition apparatus according to an aspect of the present invention, it is preferable that the conveying device be configured so as to be capable of being disposed with the longitudinal direction of the specimens parallel to the first direction.

By doing so, more slide glass specimens can be arranged in the second direction, and therefore, the conveying device is more easily made compact in the width direction.

With the virtual-slide specimen image acquisition apparatus according to an aspect of the present invention, the conveying device may be configured so as to be capable of being disposed with the longitudinal direction of the specimens parallel to the second direction.

With this configuration, more slide glass specimens can be arranged in the first direction, and therefore, the conveying device is more easily made compact in the conveying direction thereof.

With the virtual-slide specimen image acquisition apparatus according to an aspect of the present invention, it is preferable that a storing device be additionally provided, wherein, for each image of a predetermined section of a predetermined specimen captured by the image capturing device, positional information of the section is stored in a predetermined image storage region in association with the captured image.

By doing so, images of all sections of the slide glass specimens are captured by repeating image capturing for each predetermined section of a plurality of the slide glass specimens, and thus, even if image data of each section to be stored in an image storage region is not stored individually for the slide glass specimens, a virtual slide image of each slide glass specimen can be easily recreated, by searching the image data of all sections of each slide glass specimen.

Embodiments of the present invention will be described below, using the drawings.

First Embodiment

Figure 1B:
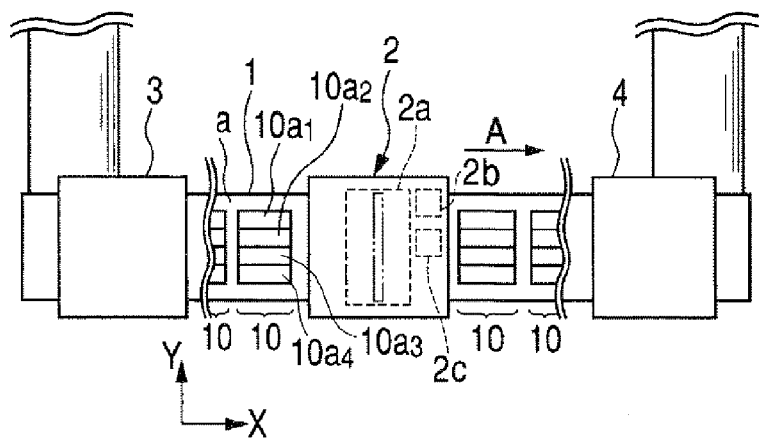
FIG. 1B is a diagram of the configuration of the main portions in FIG. 1A in a top view.
Figure 1C:
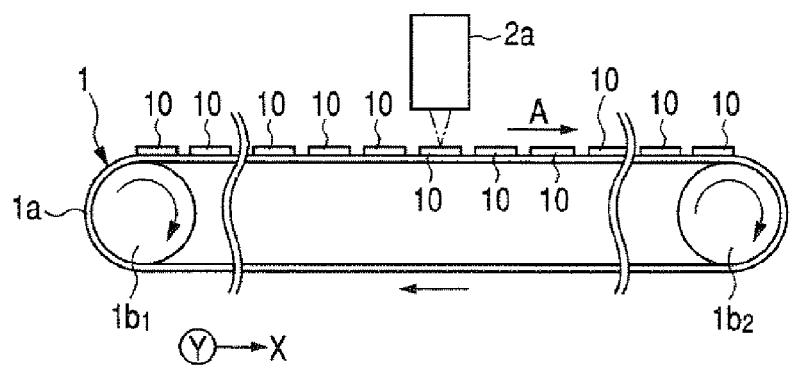
FIG. 1C is a diagram of a conveying device in FIG. 1A in a side view.
Figure 2:
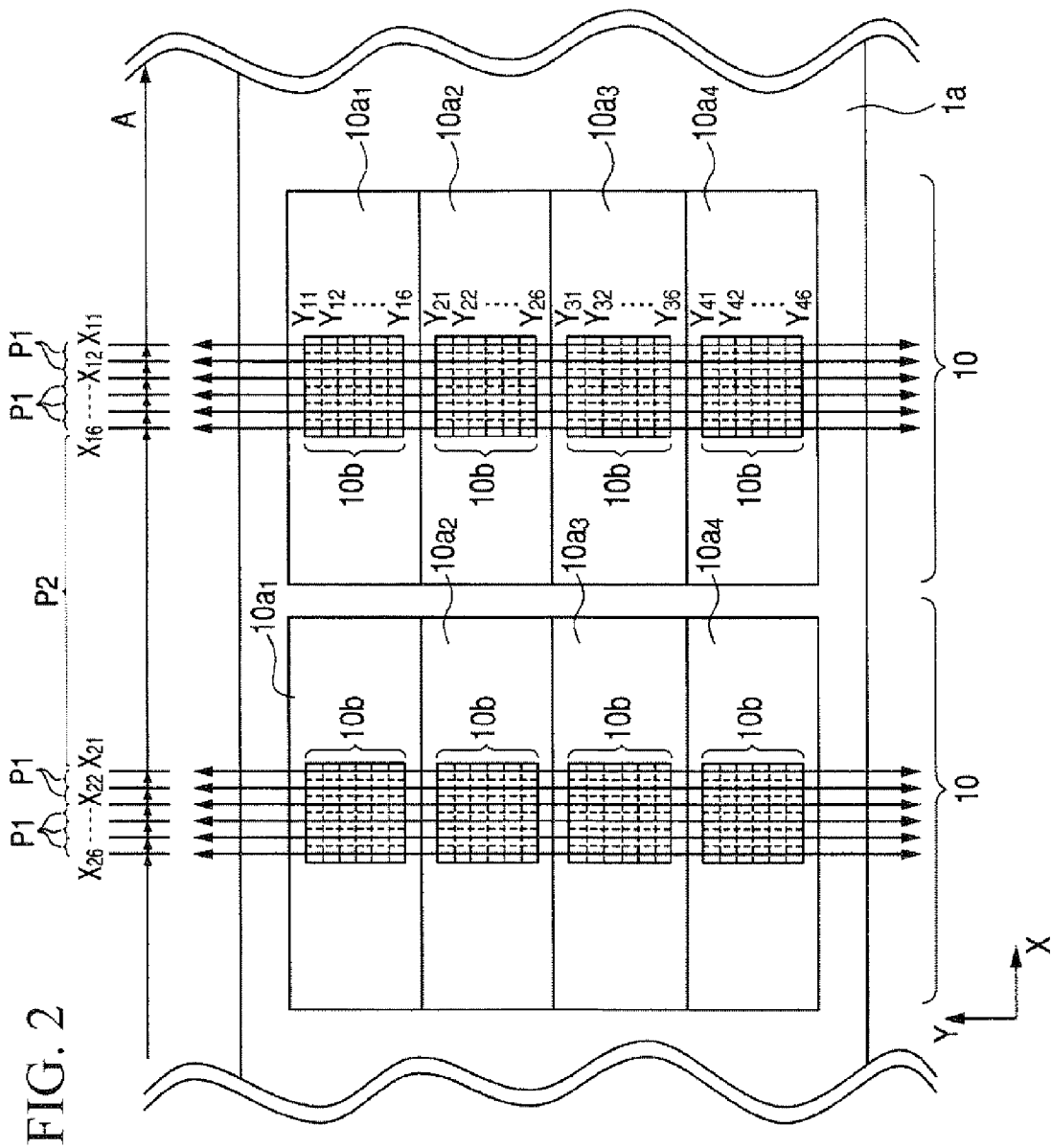
FIG. 2 is an explanatory diagram showing the conveying operation and scanning regions in image acquisition processing of slide glass specimens using the virtual-slide specimen image acquisition apparatus of the first embodiment.

FIG. 1A is an explanatory diagram showing, in outline, the configuration of a virtual-slide specimen image acquisition apparatus according to a first embodiment of the present invention and is a perspective view of the configuration of the main portions thereof; FIG. 1B is a diagram of the configuration of the main portions in FIG. 1A in a top view; and FIG. 1C is a diagram of a conveying device in a side view. FIG. 2 is an explanatory diagram showing the conveying operation and scanning regions in image acquisition processing of slide glass specimens, employing the virtual-slide specimen image acquisition apparatus of the first embodiment. FIG. 3 is an explanatory diagram showing the data arrangement of positional information of the sections and images of the sections that are captured via the virtual-slide specimen image acquisition apparatus of the first embodiment and stored in an image storage device.

FIG. 4A is an explanatory diagram showing an example of the conveying operation and scanning regions in image acquisition processing of slide glass specimens by a conventional virtual-slide specimen image acquisition apparatus according to a Comparative Example of the present invention and is a diagram showing an example of the conveying operation and scanning regions in image acquisition processing with an area sensor camera. FIG. 4B is a diagram showing an example of the conveying operation and scanning regions in image acquisition processing with a line sensor camera.

As shown in FIG. 1A, a virtual-slide specimen image acquisition apparatus of the first embodiment has a conveying device 1 for conveying specimens, an image capturing device 2 for capturing images of specimens magnified at a predetermined magnification, a loader 3 for loading the specimens onto the conveying device 1, an unloader 4 for unloading the specimens from the conveying device 1, a control device 5, and a display device 6.

The conveying device 1 is provided with a circular belt $1a$ and conveying shafts $1b_1$ and $1b_2$.

The circular belt $1a$ has a width allowing four slide glass specimens $10a_1$, $10a_2$, $10a_3$, and $10a_4$ to be arranged in a direction perpendicular to the conveying direction (arrow A direction). The four slide glass specimens $10a_1$, $10a_2$, $10a_3$, and $10a_4$ constitute a specimen group 10 when placed in a holder (not shown). In addition, the circular belt $1a$ has a length allowing multiple sets of the specimen groups 10 to be arranged in the conveying direction.

As shown in FIG. 1C, the conveying shafts $1b_1$ and $1b_2$ are interposed at the inner surface of the circular belt $1a$. In addition, the conveying shafts $1b_1$ and $1b_2$ are provided with rotational driving devices (not shown) such as motors or the like and are configured so as to circulate the circular belt $1a$ to enable specimens to be conveyed by rotating the rotational driving devices.

In addition, the rotational velocity and the amount of rotation of the rotational driving devices provided for the conveying shafts $1b_1$ and $1b_2$, such as motors or the like, are controlled via a control portion $5a$ of the control device 5, described later.

As shown in FIG. 1B, the image capturing device 2 is provided with an image capturing portion $2a$, a scanning portion $2b$ that scans the image capturing portion $2a$, and a driving portion $2c$. The image capturing portion $2a$ is composed of a line sensor camera. Note that the driving portion $2c$ need not be provided if it is not especially needed.

The line sensor camera has an image-forming optical system and a line sensor having a row of photoreceptors, and is configured such that operation of the photoreceptors is sequentially shifted so as to simultaneously capture images of all sections that are positioned identically in the conveying direction and that are positioned differently in a direction perpendicular to the conveying direction in specimen mounted portions of individual specimens $10a_1$, $10a_2$, $10a_3$, and $10a_4$ of the specimen group 10 conveyed to a predetermine position.

The loader 3 is configured so as to load the specimen groups 10 placed in holders (not shown) on the conveying belt $1a$.

The unloader 4 is configured so as to remove the specimen groups 10 loaded on the conveying belt $1a$.

As shown in FIG. 1A, the control device 5 is provided with the control portion $5a$, an image storing area $5b$, and an image processing portion $5c$.

The control portion $5a$ is configured so as to control the conveying operation of the conveying device 1, the image acquisition operation of the image capturing device 2, the loading operation of the loader 3, and the unloading operation of the unloader 4.

For every image of a predetermined section of a specimen captured via the image capturing device 2, the image storing area $5b$ provides the function of storing the image of the section in association with positional information thereof.

The image processing portion $5c$ is configured so as to search for ages of all sections based on the positional information associated with the images of individual sections of a single specimen, stored in the image storing area $5b$, and to recreate a single specimen image by connecting the found images of individual sections.

The display device 6 is configured so as to be able to display the specimen image recreated by the image processing portion $5c$.

Here, details of the conveying operation of the conveying device 1 and the image acquisition operation of the image capturing device 2 in the virtual-slide specimen image acquisition apparatus of the first embodiment will be explained using FIG. 2. In FIG. 2, for the sake of simplicity, an image capturing region of a single specimen is assumed to be divided into 36 sections of 6 rows and 6 columns. Note that, in reality, the image capturing region is divided into smaller sections.

The conveying device 1 is controlled so as to convey specimens only in one direction (arrow A direction in FIG. 2) via the control portion 5a. In addition, the conveying device 1 is controlled, via the control portion 5a, such that the specimen mounted portions of the specimen group 10 that is conveyed to a predetermined position (the image capturing position for the image capturing portion 2a), carrying individual specimens $10a_1$, $10a_2$, $10a_3$, and $10a_4$ (that is, portions covered by cover glasses 10b), are conveyed at a predetermined pitch P1 by a distance corresponding to the length of a side of one divided section along a first direction (for example, the length between position $X_{11}$ and position $X_{12}$ of a side in the x-axis direction). In addition, the conveying device 1 is controlled, via the control portion 5a, so as to convey the specimens at a predetermined pitch P2 by a distance corresponding to the length between the specimen mounted portions of one specimen group 10 and the specimen mounted portions of the next specimen group 10.

The image capturing portion 2a is controlled such that the operation of the photoreceptors is sequentially shifted so that, when the specimen mounted portions of the specimen group 10 are conveyed to the predetermined position (the image capturing position for the image capturing portion 2a), it is possible to simultaneously capture images of all sections that are positioned identically in the conveying direction and that are positioned differently in the direction perpendicular to the conveying direction (for example, when position $X_{11}$ of a side in the x-axis direction is positioned at the image capturing position, all sections whose sides in the x-axis direction are positioned at $X_{11}$ and whose sides in the y-axis direction are positioned at $Y_{11}$ to $Y_{16}$, $Y_{21}$ to $Y_{26}$, $Y_{31}$ to $Y_{36}$, and $Y_{41}$ to $Y_{46}$) in the specimen mounted portions of individual specimens $10a_1$, $10a_2$, $10a_3$, and $10a_4$ of the specimen group 10.

The specimen image acquisition procedure using the thus-configured virtual-slide specimen image acquisition apparatus of the first embodiment will now be described.

Four slide glass specimens $10a_1$, $10a_2$, $10a_3$, and $10a_4$ are placed in the holder (not shown). Then, the specimen group 10 placed in the holder is inserted into the loader 3.

The loader 3 sequentially loads the inserted specimen groups 10 onto the circular belt 1a.

The conveying device 1 conveys the specimen groups 10, loaded on the circular belt 1a, in the arrow A direction towards the image capturing device 2.

When sections whose sides in the first direction (x-axis direction) shown in FIG. 2 are positioned at $X_{11}$ are conveyed to the image capturing position, the conveying device 1 halts conveying in the arrow A direction. Subsequently, the image capturing portion 2a simultaneously captures images of all sections of the slide glass specimens $10a_1$, $10a_2$, $10a_3$, and $10a_4$ whose sides in the first direction (x-axis direction) are positioned at $X_{11}$ and whose sides in the direction perpendicular to that direction (y-axis direction) are positioned at $Y_{11}$ to $Y_{16}$, $Y_{21}$ to $Y_{26}$, $Y_{31}$ to $Y_{36}$, and $Y_{41}$ to $Y_{46}$.

Note that images of the sections at $Y_{11}$ to $Y_{16}$, $Y_{21}$ to $Y_{26}$, $Y_{31}$ to $Y_{36}$, and $Y_{41}$ to $Y_{46}$ may be separately captured by the image capturing portion 2a. For example, it is possible to simultaneously capture only the images of the sections at $Y_{11}$ to $Y_{16}$ with the image capturing portion 2a, and subsequently, to move the image capturing portion 2a with the driving portion 2c to the sections at $Y_{21}$ to $Y_{26}$, to simultaneously capture only the images of the sections at $Y_{21}$ to $Y_{26}$ with the image capturing portion 2a.

The captured images are stored in the image storing area 5b in association with positional information of the corresponding sections. In other words, as shown in FIG. 3, the image storing area 5b stores, via the control portion 5a, the positional information of the sections (positional information of the sides in the x-axis direction and positional information of the sides in the y-axis direction) as key information, with which the images corresponding to the sections are also stored, forming one set of data. Note that, here, the control portion 5a executes control for regions in which positional information of the sides in the y-axis direction forms a single unit for each of the slide glass specimens $10a_1$, $10a_2$, $10a_3$, and $10a_4$ (that is, $Y_{11}$ to $Y_{16}$, $Y_{21}$ to $Y_{26}$, $Y_{31}$ to $Y_{36}$, or $Y_{41}$ to $Y_{46}$) such that the key information and the images corresponding to the key information are stored in the image storing area 5b as one set of data.

Subsequently, the conveying device 1 resumes conveying in the arrow A direction at the pitch P1. Then, when sections whose sides in the first direction (x-axis direction) are positioned at $X_{12}$ are conveyed to the image capturing position, the conveying device 1 halts conveying in the arrow A direction. Subsequently, the image capturing portion 2a simultaneously captures images of all sections of the slide glass specimens $10a_1$, $10a_2$, $10a_3$, and $10a_4$ whose sides in the first direction (x-axis direction) are positioned at $X_{12}$ and whose sides in the direction perpendicular to the first direction (y-axis direction) are positioned at $Y_{11}$ to $Y_{16}$, $Y_{21}$ to $Y_{26}$, $Y_{31}$ to $Y_{36}$, and $Y_{41}$ to $Y_{46}$.

The captured images are stored in the image storing area 5b in association with positional information of the corresponding sections. In other words, as shown in FIG. 3, the image storing area 5a stores, via the control portion 5a, the positional information of the sections (positional information of the sides in the x-axis direction and positional information of the sides in the y-axis direction) as the key information, with which the images corresponding to those sections are also stored, forming one set of data. Note that, the control portion 5a executes control for regions in which positional information of the sides in the y-axis direction forms a single unit for each of the slide glass specimens $10a_1$, $10a_2$, $10a_3$, and $10a_4$ (that is, $Y_{11}$ to $Y_{16}$, $Y_{21}$ to $Y_{26}$, $Y_{31}$ to $Y_{36}$, or $Y_{41}$ to $Y_{46}$) such that the key information and the images corresponding to the key information are stored in the image storing area 5b as one set of data.

Similarly, the procedures starting from the conveying operation by the conveying device 1 to the image capturing operation by the image capturing portion 2a and the storing operation in the image storing area 5b are repeated until the procedures are carried out for all sections whose sides in the first direction (x-axis direction) are located at position $X_{16}$ and whose sides in the direction perpendicular to the first direction (y-axis direction) are located at $Y_{11}$ to $Y_{16}$, $Y_{21}$ to $Y_{26}$, $Y_{31}$ to $Y_{36}$, and $Y_{41}$ to $Y_{46}$. This completes the image acquisition processing of the slide glass specimens $10a_1$, $10a_2$, $10a_3$, and $10a_4$ in one specimen group 10.

Subsequently, the conveying device 1 resumes conveying in the arrow A direction at the pitch P2. Then, when sections whose sides in the first direction (x-axis direction) are positioned at $X_{21}$ are conveyed to the image capturing position, the conveying device 1 halts conveying in the arrow A direction. Subsequently, the image capturing portion 2a simultaneously captures images of all sections of the slide glass specimens $10a_1$, $10a_2$, $10a_3$, and $10a_4$ whose sides in the first direction (x-axis direction) are positioned at $X_{21}$ and whose sides in the direction perpendicular to the first direction (y-axis direction) are positioned at $Y_{11}$ to $Y_{16}$, $Y_{21}$ to $Y_{26}$, $Y_{31}$ to $Y_{36}$, and $Y_{41}$ to $Y_{46}$.

The captured images are stored in the image storing area 5b in association with positional information of the sections.

Similarly, the procedures starting from the conveying operation by the conveying device 1 to the image capturing operation by the image capturing portion 2a and the storing operation in the image storing area 5b are repeated until the procedures are carried out for all sections whose sides in the first direction (x-axis direction) are located at position $X_{26}$ and whose sides in the direction perpendicular to the first direction (y-axis direction) are located at $Y_{11}$ to $Y_{16}$, $Y_{21}$ to $Y_{26}$, $Y_{31}$ to $Y_{36}$, and $Y_{41}$ to $Y_{46}$. This completes the image acquisition processing of slide glass specimens $10a_1$, $10a_2$, $10a_3$, and $10a_4$ in the next specimen group 10.

In this way, by repeating similar processing for n specimen groups 10, images of the slide glass specimens $10a_1$, $10a_2$, $10a_3$, and $10a_4$ loaded on the circular belt 1a can be acquired.

The specimen groups 10 for which image acquisition processing by the image capturing device 2 is completed are sequentially conveyed to the unloader 4. The unloader 4 sequentially unloads the specimen groups 10.

With the virtual-slide specimen image acquisition apparatus of the first embodiment, because the conveying direction of the conveying device 1 is limited to one direction, the conveying direction need not be switched when acquiring images of a plurality of slide glass specimens. In addition, by arranging a plurality of slide glass specimens in the direction perpendicular to the first direction, images of a plurality of slide glass specimens arranged in the direction perpendicular to the first direction are simultaneously captured in the direction perpendicular to the first direction via the image capturing portion 2a; therefore, the time required to acquire images of all sections of the specimens can be shortened. As a result, image acquisition processing for each slide glass specimen can be accelerated, and the time required for image acquisition processing of a large number of slide glass specimens can be considerably shortened.

With the virtual-slide specimen image acquisition apparatus of the first embodiment, because the conveying device 1 is configured such that multiple sets of the specimen groups 10 can be arranged in the first direction, image acquisition processing can be carried out for a large number of slide glass specimens. Furthermore, because additional specimen groups 10 are arranged in the first direction, it is possible to achieve a cumulative effect of shortening the time required for image acquisition processing, when acquiring images of all sections of a plurality of the specimens arranged in the direction perpendicular to the first direction. As a result, the time required for image acquisition processing of a large number of slide glass specimens can be considerably shortened.

With the virtual-slide specimen image acquisition apparatus of the first embodiment, the conveying device 1 can convey specimens by circulating in one direction. Accordingly, by disposing the loader 3 and unloader 4 in the conveying path of the conveying device 1 for loading and unloading the slide glass specimens, the slide glass specimens can be loaded onto the conveying device 1 in the step prior to image acquisition processing and can be unloaded from the conveying device 1 in the step following image acquisition processing, without switching the conveying direction of the conveying device 1.

As a result, the time required for image acquisition processing of a large number of slide glass specimens can be shortened even further.

With the virtual-slide specimen image acquisition apparatus of the first embodiment, because the conveying device 1 is configured having the circular belt 1a and the conveying shafts $1b_1$ and $1b_2$, the space required for installation can be reduced, and the size of the entire virtual-slide specimen image acquisition apparatus can be reduced.

With the virtual-slide specimen image acquisition apparatus of the first embodiment, because the conveying device 1 is configured such that it can be disposed with the longitudinal direction of the specimens parallel to the first direction, more slide glass specimens can be arranged in the direction perpendicular to the first direction. Accordingly, the conveying device 1 is more easily made compact in the width direction.

Here, as a Comparative Example of the first embodiment, FIGS. 4A and 4B show examples of the conveying operation and scanning regions in image acquisition processing of slide glass specimens by conventional virtual-slide specimen image acquisition apparatuses.

FIG. 4A shows the scanning direction and regions of a specimen 10a and the conveying direction and pitch of a conveying device 20 for a case in which an image capturing portion of an image capturing device is composed of an area sensor camera. FIG. 4B shows the scanning direction and regions of the specimen 10a and the conveying direction and pitch of the conveying device 20 for a case in which the image capturing portion of the image capturing device is composed of a line sensor camera.

With the conventional virtual-slide specimen image acquisition apparatuses, the conveying direction of the conveying device 20 is switched every time image acquisition processing is carried out for one slide glass specimen 10a.

In the example in which the image capturing portion is composed of the area sensor camera, as shown in FIG. 4A, when initiating image acquisition from a section of one slide glass specimen 10a, whose side in the x-axis direction is positioned at $X_{16}$ and whose side in the y-axis direction is positioned at $Y_{11}$, the conveying device 20 conveys the specimen at the pitch P1 in the arrow B1 direction to each section at $(X_{15}, Y_{11})$, $(X_{14}, Y_{11})$, $(X_{13}, Y_{11})$, $(X_{12}, Y_{11})$, and $(X_{11}, Y_{11})$, and images of each section are captured by the area sensor camera. After image capturing of the section at $(X_{11}, Y_{11})$ is completed, the conveying device 20 switches its direction to the arrow B2 direction, conveys the specimen at a pitch P5, and halts conveying when a section at $(X_{11}, Y_{12})$ reaches the image capturing position. Subsequently, after the area sensor camera has captured an image of the section at $(X_{11}, Y_{12})$, the conveying device 20 conveys the specimen to each section at $(X_{12}, Y_{12})$, $(X_{13}, Y_{12})$, $(X_{14}, Y_{12})$, $(X_{15}, Y_{12})$, and $(X_{16}, Y_{12})$, at the pitch P1 in the arrow A direction, and captures images of each section with the area sensor camera. A similar conveying operation and image capturing processing are repeated for the sections thereafter, that is, the sections at $(X_{16}, Y_{13})$ to $(X_{11}, Y_{13})$, the sections at $(X_{11}, Y_{14})$ to $(X_{16}, Y_{14})$, the sections at $(X_{16}, Y_{15})$ to $(X_{11}, Y_{15})$, and the sections at $(X_{11}, Y_{16})$ to $(X_{16}, Y_{16})$. This completes the image acquisition processing of a single slide specimen 10a, for all sections in the specimen mounted portion. Note that individual captured images are stored in the image storing area (not shown) in association with positional information of the sections.

At this time, until image acquisition processing of a single slide glass specimen 10a is completed for all sections in the specimen mounted portion, as shown by the reference sign B in FIG. 4A, the conveying device 20 switches the conveying direction three times from the arrow B1 direction the arrow B2 direction, three times from the arrow B2 direction to the arrow A direction, twice from the arrow A direction to the arrow B2 direction, and twice from the arrow B2 direction to the arrow B1 direction.

In addition, the conveying direction is switched for conveying the slide glass specimen 10a to a loading device in the step before image acquisition processing, for conveying the loaded slide glass specimen 10a to the image capturing position, and for conveying the slide glass specimen 10a to an unloading device in the step after image acquisition processing.

Accordingly, the time required for image acquisition and loading/unloading processing for a single slide glass specimen is increased by the time spent switching the conveying direction.

Furthermore, as shown in FIG. 4B, in an example wherein the image capturing portion is composed of a line sensor camera, when sections in a single slide glass specimen 10a whose sides in the x-axis direction are positioned at $X_{11}$ are conveyed to the image capturing position, the conveying device 20 halts conveying in the arrow B1 direction. Subsequently, the line sensor camera simultaneously captures images of all sections of the slide glass specimen 10a whose sides in the first direction (x-axis direction) are positioned at $X_{11}$ and whose sides in the direction perpendicular to the first direction (y-axis direction) are positioned at $Y_{11}$ to $Y_{16}$. Note that captured images are stored in the image storing area (not shown) in association with positional information of the sections.

Subsequently, the conveying device 20 resumes conveying in the arrow B1 direction at the pitch P1. Then, when sections whose sides in the first direction (x-axis direction) are positioned at $X_{12}$ are conveyed to the image capturing position, the conveying device 20 halts conveying in the arrow B1 direction. Subsequently, the line sensor camera simultaneously captures images of all sections of the slide glass specimen 10a whose sides in first direction (x-axis direction) are positioned at $X_{12}$ and whose sides in the direction perpendicular to the first direction (y-axis direction) are positioned at $Y_{11}$ to $Y_{16}$. Note that captured images are stored in the image storing area (not shown) in association with positional information of the sections.

Similarly, the procedures starting from the conveying operation by the conveying device 20 to the image capturing operation by the line sensor camera and the storing operation in the image storing area are repeated until the procedures are carried out for all sections whose sides in the first direction (x-axis direction) are located at position $X_{16}$ and whose sides in the direction perpendicular to the first direction (y-axis direction) are located at $Y_{11}$ to $Y_{16}$. This completes the image acquisition processing of a single slide glass specimen 10a.

With the example in FIG. 4B, because images of the slide glass specimen 10a are simultaneously captured in the direction perpendicular to the first direction, via the line sensor camera, the time required for acquiring images of all sections of the specimen can be shortened. In addition, the conveying direction of the conveying device 20 need not be switched when acquiring images of all sections of the specimen.

Nonetheless, even with the example in FIG. 4B, as shown by the reference sign B', the conveying direction needs to be switched from the arrow B1 direction to the arrow A direction, in order to convey the slide glass specimen 10a to the loading device in the step before image acquisition processing, to convey the loaded slide glass specimen 10a to the image capturing position, and to convey the slide glass specimen 10a to the unloading device in the step after the image acquisition processing.

Accordingly, the time required for loading/unloading processing for a single slide glass specimen is increased by the time spent switching the conveying direction.

In this way, with the conventional virtual-slide specimen image acquisition apparatuses, the conveying direction of the conveying device 20 needs to be switched each time processing for loading, image acquisition, and unloading of a single slide glass specimen 10a is performed.

On the other hand, in this type of virtual-slide specimen image acquisition apparatus, processing of a large number of slide glass specimens is required.

Accordingly, an increase in the processing time required for each slide glass specimen accumulates, and the time required for loading, image acquisition, and unloading processing of a large number of slide glass specimens becomes enormous.

In contrast, with the virtual-slide specimen image acquisition apparatus of the first embodiment, the conveying direction of the conveying device 1 for loading processing, image acquisition processing, and unloading processing of a slide glass specimen is fixed in one direction, and there is no switching of the conveying direction.

Furthermore, because images of a plurality of the slide glass specimens arranged in the direction perpendicular to the first direction are simultaneously captured in the direction perpendicular to the first direction, the time required to capture images of all sections of the specimen can be shortened.

Accordingly, with the virtual-slide specimen image acquisition apparatus of the first embodiment, as compared with the conventional virtual-slide specimen image acquisition apparatuses, image acquisition processing for each slide glass specimen can be accelerated, and the time required for image acquisition processing of a large number of slide glass specimens can be considerably shortened.

Note that although one specimen group 10 in the virtual-slide specimen image acquisition apparatus of the first embodiment is constituted of four slide glass specimens, the number of slide glass specimens constituting a specimen group 10 is not limited.

Additionally, although the slide glass specimens in the virtual-slide specimen image acquisition apparatus of the first embodiment are configured so as to be conveyable, circulated by the conveyer provided with the circular belt and the conveying shafts, a non-circulating configuration may be employed. For example, the movement may be provided by a narrow, elongated plate-like member. In such a case, after completion of loading processing, image acquisition processing, and unloading processing for all slide glass specimens mounted on the narrow, elongated plate-like member, the narrow, elongated plate-like member needs to be moved in the opposite direction from the first direction to be reset to the initial location. However, unlike the conventional virtual-slide specimen image acquisition apparatuses, there is no need for switching the conveying direction of the conveying device for each slide glass specimen, and therefore, the effect of accelerating image acquisition processing per slide glass specimen can be maintained, and the time required for image acquisition processing of a large number of slide glass specimens can be considerably shortened.

In addition, with the virtual-slide specimen image acquisition apparatus of the first embodiment, it is preferable that the circular belt 1a be configured to have holding portions that hold the specimen groups 10.

By doing so, the slide glass specimens can be disposed on the entire circumference of the circular belt, thereby considerably increasing the number of specimens to be processed; therefore, image acquisition processing can be carried out more efficiently.

In addition, with the virtual-slide specimen image acquisition apparatus of the first embodiment, the circular belt $1a$ may be configured to be detachable from the conveying shafts $1b_1$ and $1b_2$.

By doing so, multiple sets of circular belts $1a$ holding the slide glass specimens in the holding portions can be prepared, and the whole belt $1a$ can be exchanged upon completing image acquisition processing of all slide glass specimens on the circular belt $1a$. Accordingly, a loader for loading or unloading the slide glass specimens need not be provided.

The conveying device 1 in the virtual-slide specimen image acquisition apparatus of the first embodiment may be configured such that it can be disposed with the longitudinal direction of the specimens parallel to the first direction.

By doing so, more slide glass specimens can be arranged in the first direction, and therefore, the conveying device is more easily made compact in the conveying direction thereof.

Second Embodiment

Figure 5A:
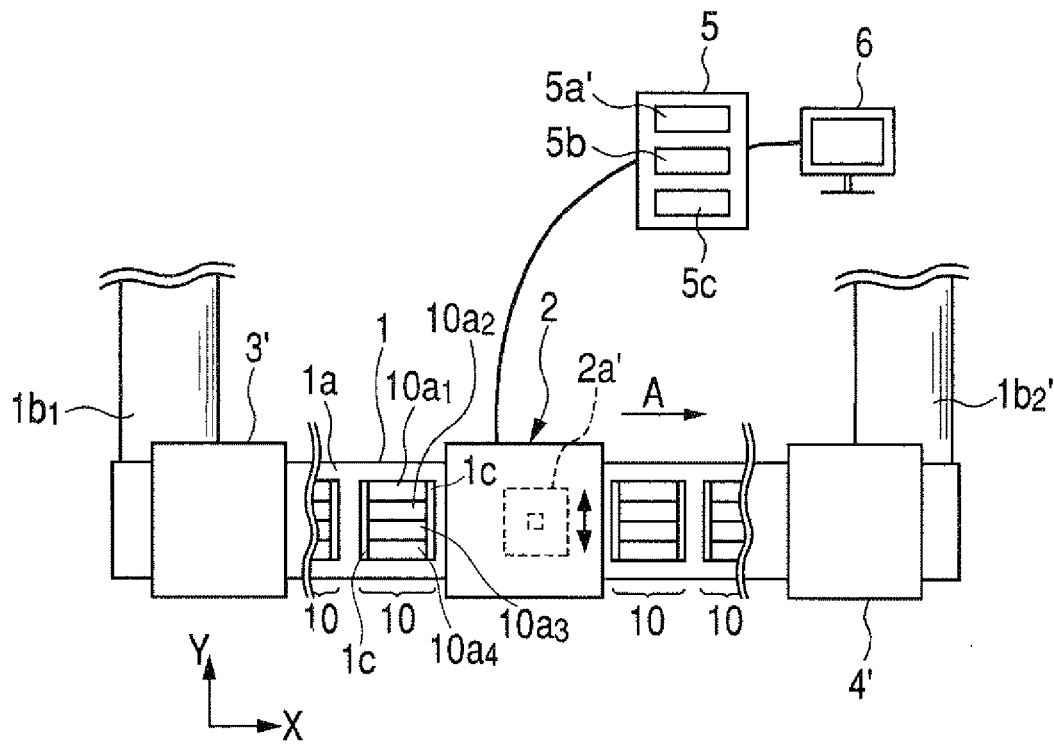
FIG. 5A is an explanatory diagram showing, in outline, the configuration of a virtual-slide specimen image acquisition apparatus according to a second embodiment of the present invention and is a diagram of the configuration of the main portions thereof in a top view.
Figure 5B:
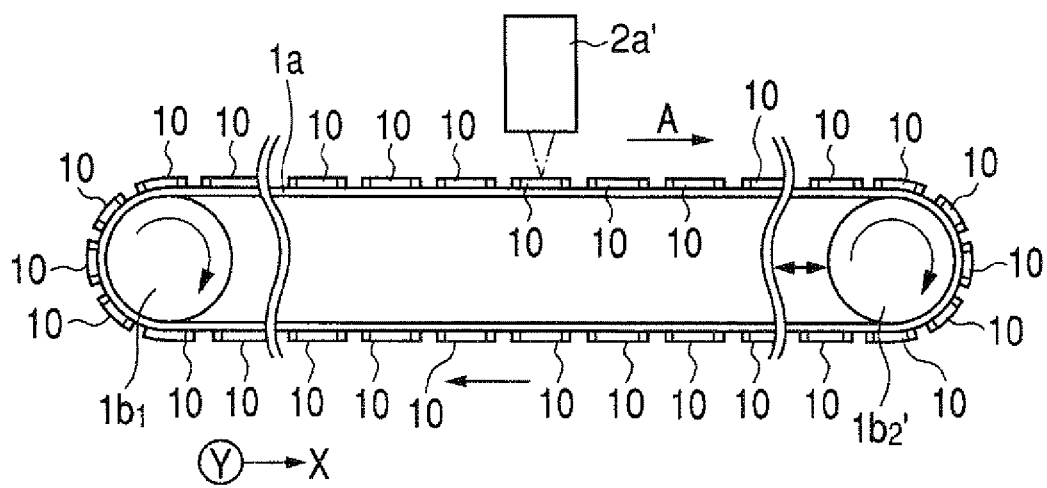
FIG. 5B is an explanatory diagram showing, in outline, the configuration of the virtual-slide specimen image acquisition apparatus according to the second embodiment of the present invention and is a diagram of a conveying device in a side view.
Figure 7:
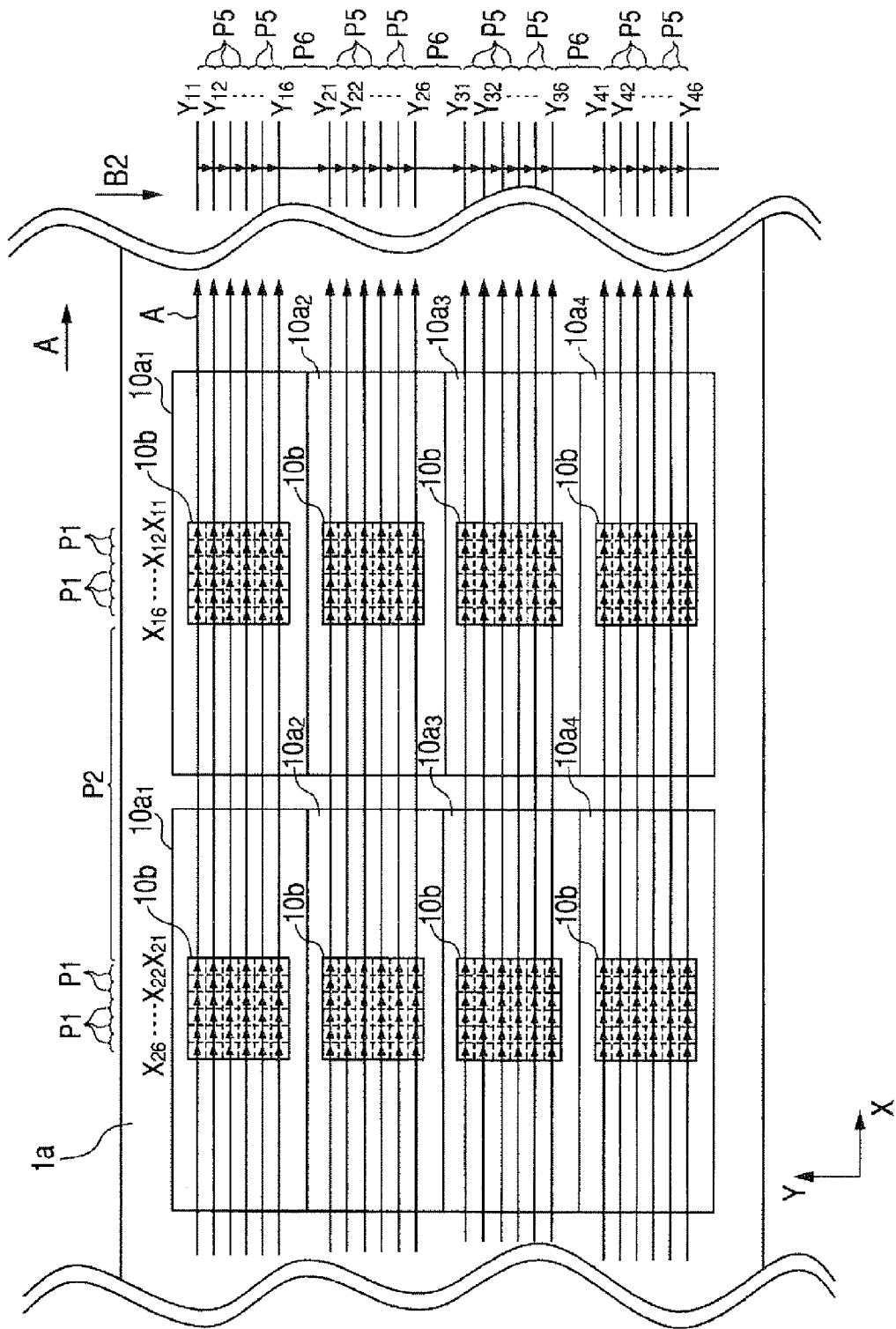
FIG. 7 is an explanatory diagram showing the data arrangement of positional information of the sections and images of the sections that are captured via the virtual-slide specimen image acquisition apparatus of the second embodiment and stored in an image storing device.

FIG. 5A is an explanatory diagram showing, in outline, the configuration of a virtual-slide specimen image acquisition apparatus according to a second embodiment of the present invention and is a diagram of the configuration of the main portions thereof in a top view. FIG. 5B is a diagram of a conveying device in a side view. FIG. 6 is an explanatory diagram showing the conveying operation and scanning regions in the image acquisition processing of slide glass specimens using the virtual-slide specimen image acquisition apparatus of the second embodiment. FIG. 7 is an explanatory diagram showing the data arrangement of positional information of the sections and images of the sections that are captured via the virtual-slide specimen image acquisition apparatus of the second embodiment and stored in an image storing device. Note that configurations identical to those of the first embodiment are denoted by the same reference signs, and detailed descriptions thereof will be omitted.

As shown in FIG. 5A, a virtual-slide specimen image acquisition apparatus of the second embodiment has a conveying device 1 for conveying specimens, an image capturing device 2 for capturing images of specimens magnified to a predetermined magnification, a loader 3' for loading the specimens to the conveying device 1, an unloader 4' for unloading the specimens from the conveying device 1, a control device 5, and a display device 6.

The conveying device 1 is provided with a circular belt $1a$ and conveying shafts $1b_1$ and $1b_2$'.

The circular belt $1a$ has a width allowing four slide glass specimens $10a_1$, $10a_2$, $10a_3$, and $10a_4$ to be arranged in the direction perpendicular to the conveying direction (arrow A direction). The four slide glass specimens $10a_1$, $10a_2$, $10a_3$, and $10a_4$ constitute a specimen group 10 when placed in a holder (not shown). In addition, the circular belt $1a$ has a length allowing multiple sets of the specimen groups 10 to be arranged in the conveying direction. Furthermore, the circular belt $1a$ has holding portions ($1c$) for holding individual specimen groups 10.

As shown in FIG. 5B, the conveying shafts $1b_1$ and $1b_2$' are interposed at the inner surface of the circular belt $1a$. In addition, the conveying shafts $1b_1$ and $1b_2$' are provided with rotational driving devices (not shown), such as motors or the like, and are configured so as to circulate the circular belt $1a$ to enable specimens to be conveyed by rotating the rotational driving devices.

In addition, the rotational velocity and the amount of rotation of the rotational driving devices provided for the conveying shafts $1b_1$ and $1b_2$', such as motors or the like, are controlled via a control portion $5a'$ of the control device 5, described later.

Additionally, the conveying belt $1a$ has holding portions $1c$ for holding specimen groups 10.

Furthermore, the conveying shaft $1b_2$' is configured so as to be movable in a direction perpendicular to the longitudinal direction, and the circular belt $1a$ is configured so as to be detachable from the conveying shafts $1b_1$ and $1b_2$', by moving the conveying shaft $1b_2$' in the direction perpendicular to the longitudinal direction.

The image capturing device 2 is provided with an image capturing portion $2a'$. The image capturing portion $2a'$ is composed of an area sensor camera.

The area sensor camera has an image-forming optical system and an area sensor and is configured so as to capture images of one section of one slide glass specimen in a specimen mounted portion.

The loader 3' is configured so as to load the specimen groups 10, placed in holders (not shown), on the conveying belt $1a$, to be held in a pair of the holding portions $1c$ provided on the conveying belt $1a$. These holding portions $1c$ hold the specimen groups 10 flanking both lateral surfaces thereof so that the positions of the specimen groups 10 do not shift when the conveying belt $1a$ moves in the conveying direction (arrow A direction). Note that the shape and arrangement of the holding portions $1c$ are not particularly limited so long as the positions of the specimen groups 10 do not shift.

The unloader 4' is configured so as to unload the specimen groups 10 held in the holding portions $1c$ on the conveying belt $1a$.

As shown in FIG. 5A, the control device 5 is provided with the control portion $5a'$, an image storing area $5b$, and an image processing portion $5c$.

The control portion $5a'$ is configured so as to control the conveying operation of the conveying device 1, the image acquisition operation of the image capturing device 2, the loading operation of the loader 3', and the unloading operation of the unloader 4'.

Note that, configurations of the image storing area $5b$ and the image processing portion $5c$ in the control device 5 and the display device 6 are substantially the same as those of the virtual-slide specimen image acquisition apparatus of the first embodiment shown in FIG. 1A.

Here, the conveying operation of the conveying device 1 and the image acquisition operation of the image capturing device 2 in the virtual-slide specimen image acquisition apparatus of the second embodiment will be described in detail using FIG. 6. Note that, in FIG. 6, for the sake of simplicity, an image capturing region of a single specimen is assumed to be divided into 36 sections of 6 rows and 6 columns. In reality, however, the image capturing region is divided into smaller sections.

The conveying device 1 is controlled so as to convey specimens in one direction (arrow A direction in FIG. 6) via the control portion $5a'$. In addition, the conveying device 1 is controlled, via the control portion $5a'$, such that the specimen mounted portions of the individual specimens $10a_1$, $10a_2$, $10a_3$, and $10a_4$ (that is, portions covered by the cover glasses $10b$) in the specimen group 10 conveyed to a predetermined position (the image capturing position for the image capturing portion $2a$) are conveyed at a predetermined pitch P1 by a distance corresponding to the length of a side of one divided section along the first direction (for example, by the length between position $X_{11}$ and position $X_{12}$ of a side in the x-axis direction). In addition, the conveying device 1 is controlled, via the control portion 5a', so as to convey the specimens by a distance corresponding to the length between the specimen mounted portions of one specimen group 10 and the specimen mounted portions of the next specimen group 10, at the predetermined pitch P2.

Furthermore, the virtual-slide specimen image acquisition apparatus of the second embodiment is configured such that the image capturing device 2 is movable in the direction perpendicular to the first direction (y-axis direction).

The image capturing device 2 is controlled, via the control portion 5a', such that, images are captured with the image capturing portion 2a' for all sections that are positioned identically in the direction perpendicular to the first direction and that are positioned differently in the first direction (for example, all sections whose sides in the y-axis direction are located at $Y_{11}$, when the position $Y_{11}$ of the sides in the y-axis direction is located at the image acquisition position) in the specimen mounted portions of the specimen group 10 conveyed to the predetermined position (the image capturing position of the image capturing portion 2a'); thereafter, the relative position of the image capturing portion 2a' and the conveying device 1 is moved towards the next section located in the direction perpendicular to the first direction (the sections whose sides in the y-axis direction are located at position $Y_{12}$); and this action is repeated until images are captured by the image capturing device 2 (the image capturing portion 2a' therein) for all sections of all specimens arranged on the conveying device 1.

Note that, the relative position of the image capturing device 2 and the conveying device 1 may be moved by configuring the entire conveying device 1 (or the circular belt 1a), instead of the image capturing device 2, so as to be movable in the direction perpendicular to the first direction (y-axis direction).

Note that the loading operation of the loader 3' is controlled via the control portion 5a' so as to be repeated until the specimen groups 10 are held by the holding portions over the entire circumference of the circular belt 1a.

Additionally, the unloading operation of the unloader 4a' is controlled so as to be carried out after image acquisition processing is completed for all specimen groups 10 held by the holding portions 1c of the circular belt 1a.

The specimen image acquisition procedure using the thus-configured virtual-slide specimen image acquisition apparatus of the second embodiment will be described.

Four slide glass specimens $10a_1$, $10a_2$, $10a_3$, and $10a_4$ are placed in the holder (not shown). Then, the specimen group 10 placed in the holder is inserted into the loader 3'.

The loader 3' sequentially loads the inserted specimen groups 10 on the circular belt 1a to be held by the holding portions 1c. Note that the loading operation of the loader 3' is repeated, via the control portion 5a', until the specimen groups 10 are held in the holding portions over the entire circumference of the circular belt 1a.

The conveying device 1 conveys the specimens in the arrow A direction to the image capturing device 2 with the specimen groups 10 held in the holding portions of the circular belt 1a.

Here, when image acquisition is initiated from a section whose side in the first direction (x-axis direction) shown in FIG. 6 is positioned at $X_{11}$ and whose side in the direction perpendicular to the first direction (y-axis direction) is positioned at $Y_{11}$, the conveying device 1 conveys the specimens in the arrow A direction at the pitch P1 to each of the sections at $(X_{12}, Y_{11})$, $(X_{13}, Y_{11})$, $(X_{14}, Y_{11})$, $(X_{15}, Y_{11})$, and $(X_{16}, Y_{11})$, and images of each section are captured by the image capturing portion 2a'.

The captured images are stored in the image storing area 5b in association with positional information of the corresponding sections. In other words, as shown in FIG. 7, the image storing area 5b stores, via the control portion 5a', the positional information of the sections (positional information of the sides in the x-axis direction and positional information of the sides in the y-axis direction) as key information, with which the images corresponding to the sections are also stored, forming one set of data. Note that, here, the control portion 5a' executes control for each of the sections such that the key information and the images corresponding to the key information are stored in the image storing area 5b as one set of data.

Subsequently, the conveying device 1 resumes conveying in the arrow A direction at the pitch P2. Then, when a section whose side in the first direction (x-axis direction) is positioned at $X_{21}$ whose side in the direction perpendicular to the first direction (y-axis direction) is positioned at $Y_{11}$, is conveyed to the image capturing position, the conveying device 1 conveys the specimens in the arrow A direction at the pitch P1 to each of the sections at $(X_{22}, Y_{11})$, $(X_{23}, Y_{11})$, $(X_{24}, Y_{11})$, $(X_{25}, Y_{11})$, and $(X_{26}, Y_{11})$, and images of each section are captured by the image capturing portion 2a'.

Captured images are stored in the image storing area 5b in association with positional information of the corresponding sections.

Similarly, the procedures starting from the conveying operation by the conveying device 1 to the image capturing operation by the image capturing portion 2a' and the storing operation in the image storing area 5b are repeated until the procedures are carried out for all sections whose sides in the direction perpendicular to the first direction (y-axis direction) are located at position $Y_{11}$. Subsequently, the conveying device 1 resumes conveying the specimens in the arrow A direction at the pitch P2. Then, conveying is interrupted when sections whose sides in the first direction (x-axis direction) are located at $X_{11}$ are conveyed to the image capturing position again.

Subsequently, the image capturing device 2 moves in the arrow B2 direction at a pitch P5 to the next section at $(X_{11}, Y_{12})$ located in the direction perpendicular to the first direction (y-axis direction). The movement is interrupted when the image capturing position for the image capturing portion 2a' of the image capturing device 2 is located at the section $(X_{11}, Y_{12})$. The conveying device 1 conveys in the arrow A direction at the pitch P1 to each of the sections at $(X_{11}, Y_{12})$, $(X_{12}, Y_{12})$, $X_{13}, Y_{12})$, $(X_{14}, Y_{12})$, $(X_{15}, Y_{12})$, and $(X_{16}, Y_{12})$, and images of each section are captured by the image capturing portion 2a'.

The captured images are stored in the image storing area 5b in association with positional information of the sections.

Similarly, the procedures starting from the conveying operation by the conveying device 1 to the image capturing operation by the image capturing portion 2a' and the storing operation in the image storing area 5b are repeated until the procedures are carried out for all sections whose sides in the direction perpendicular to the first direction (y-axis direction) are located at position $Y_{12}$. Subsequently, the conveying device 1 resumes conveying the specimens in the arrow A direction at the pitch P2. Then, conveying is interrupted when sections whose sides in the first direction (x-axis direction) are located at $X_{11}$ are conveyed to the image capturing position again.

Thereafter, similar processing as done for the sections whose sides in the direction perpendicular to the first direction (y-axis direction) are located at $Y_{11}$ and those located at $Y_{12}$ is repeated for sections whose sides in the direction perpendicular to the first direction (y-axis direction) are located at $Y_{13}$, $Y_{14}$, $Y_{15}$, and $Y_{16}$, respectively. Thus, image acquisition processing for all sections in the specimen mounted portion of the slide glass specimens $10a_1$ is completed for all specimen groups 10 held in the holding portions 1c on the circular belt 1a in the conveying device 1. Note that, individual captured images are stored in the image storing area 5b in association with positional information of the sections.

Subsequently, the conveying device 1 resumes conveying the specimens in the arrow A direction at the pitch P2. Then, conveying is interrupted when sections whose sides in the direction perpendicular to the first direction (y-axis direction) are located at $X_{11}$ are conveyed to the image capturing position again.

Subsequently, the image capturing device 2 moves in the arrow B2 direction at a pitch P6 to the next section at ($X_{11}$, $Y_{21}$) in the next specimen $10a_2$ located in the direction perpendicular to the first direction (y-axis direction).

Thereafter, similar processing as done for the specimen $10a_1$ is repeated for the specimen $10a_2$, the specimen $10a_3$, and the specimen $10a_4$. Accordingly, image acquisition processing for all sections in the specimen mounted portion of the slide glass specimens $10a_1$, $10a_2$, $10a_3$ and $10a_4$ is completed for all specimen groups 10 held in the holding portions (not shown) on the circular belt 1a in the conveying device 1. Note that, individual captured images are stored in the image storing area 5b in association with positional information of the sections.

Subsequently, the conveying device 1 carries out the conveying of the specimen groups 10 in the first direction at the predetermined pitch, and the unloader 4' sequentially removes the specimen groups 10 held in the holding portions (not shown) on the conveying belt 1a.

With the virtual-slide specimen image acquisition apparatus of the second embodiment, because the conveying direction of the conveying device 1 is limited to the first direction, the conveying direction need not be switched when acquiring images of a plurality of slide glass specimens. In addition, the image capturing device 2 is controlled, via the control portion 5', such that images are captured with the image capturing portion 2a' for all sections that are positioned identically in the direction perpendicular to the first direction and that are positioned differently in the first direction (for example, all sections whose sides in the y-axis direction are located at $Y_{11}$, when the position $Y_{11}$ of the sides in the y-axis direction is located at the image acquisition position) in the specimen mounted portions of the specimen group 10 conveyed to the predetermined position (the image capturing position for the image capturing portion 2a'), and thereafter, the relative position of the image capturing portion 2a' and the conveying device 1 is moved towards the next section located in the direction perpendicular to the first direction (the sections whose sides in the y-axis direction are located at position $Y_{12}$); and this action is repeated until images are captured by the image capturing device 2 (the image capturing portion 2a' therein) for all sections of all specimens arranged on the conveying device 1; therefore, the time required to acquire images of all sections of the specimens can be shortened. As a result, image acquisition processing for each slide glass specimen can be accelerated, and the time required for image acquisition processing of a large number of slide glass specimens can be considerably shortened.

Note that, with the virtual-slide specimen image acquisition apparatus of the second embodiment, when the relative position of the image capturing device 2 and the conveying device 1 is moved by configuring the entire conveying device 1 (or the circular belt 1a), instead of the image capturing device 2, so as to be movable in the direction perpendicular to the direction (y-axis direction), the conveying device 1 switches the conveying direction from the arrow A direction to the arrow B2 direction every time images are captured by the image capturing portion 2a' for all sections that are positioned identically in the direction perpendicular to the first direction and that are positioned differently in the first direction in the specimen mounted portions in the specimen group 10 conveyed to the predetermined position (the image capturing position of the image capturing portion 2a'). However, the conveying device 1 conveys only in a single direction without reciprocation when conveying in the arrow A direction and when conveying in the arrow B2 direction, and furthermore, image capturing is carried out for all sections for which the specimen mounted portions are identically positioned in the direction perpendicular to the first direction and are differently positioned in the first direction, by switching once in the arrow B2 direction; therefore, the effect of reducing the image capturing time required for acquiring images of all sections of the specimens can be maintained. As a result, the image acquisition processing for each slide glass specimen can be accelerated, and the time required for image acquisition processing of a large number of slide glass specimens can be considerably shortened.

Additionally, with the virtual-slide specimen image acquisition apparatus of the second embodiment, as with the virtual-slide specimen image acquisition apparatus of the first embodiment, the conveying device 1 is configured such that multiple specimen groups 10 can be arranged in the first direction, and therefore, image acquisition processing for a large number of slide glass specimens can be performed. Furthermore, a cumulative effect of reducing the time required for image acquisition processing when acquiring images of all sections of a plurality of specimens arranged in the direction perpendicular to the first direction can be achieved due to the specimen groups 10 additionally arranged in the first direction. Therefore, the time required for image acquisition processing of a large number of slide glass specimens can be considerably shortened.

Additionally, with the virtual-slide specimen image acquisition apparatus of the second embodiment, as with the virtual-slide specimen image acquisition apparatus of the first embodiment, the conveying device 1 is configured having the circular belt 1a and the conveying shafts $1b_1$ and $1b_2$, and therefore, the space required for installation can be reduced and the size of the entire specimen image acquisition apparatus can be reduced.

Furthermore, because the circular belt 1a is provided with the holding portions, the conveying device can be circulated without detaching the slide glass specimens from the circular belt.

Note that, the conveying shaft $1b_2$ in the virtual-slide specimen image acquisition apparatus of the second embodiment is configured so as to be movable in the direction perpendicular to the longitudinal direction, and thereby, the circular belt 1a is detachable from the conveying shafts $1b_1$ and $1b_2$.

Accordingly, multiple sets of circular belts holding the slide glass specimens in the holding portions can be prepared, and the whole belt may be exchanged upon completing the image acquisition processing for all slide glass specimens on the circular belt, by moving the conveying shaft $1b_2$ in the direction perpendicular to the longitudinal direction. By doing so, the loader 3' and unloader 4' for loading and unloading the slide glass specimens need not be provided.

In addition, with the virtual-specimen slide image acquisition apparatus of the second embodiment, because the conveying device 1 is configured such that it can be disposed with the longitudinal direction of the specimens parallel to the first direction, more slide glass specimens can be arranged in the direction perpendicular to the first direction and the conveying device 1 is easily made compact in the width direction.

Note that the conveying device 1 in the virtual-slide specimen image acquisition apparatus of the second embodiment may be configured such that it can be disposed with the longitudinal direction of the specimens parallel to the direction perpendicular to the first direction.

By doing so, more slide glass specimens can be arranged in the first direction, and thereby, the conveying device 1 is easily made compact in the conveying direction thereof.

Third Embodiment

Figure 8:
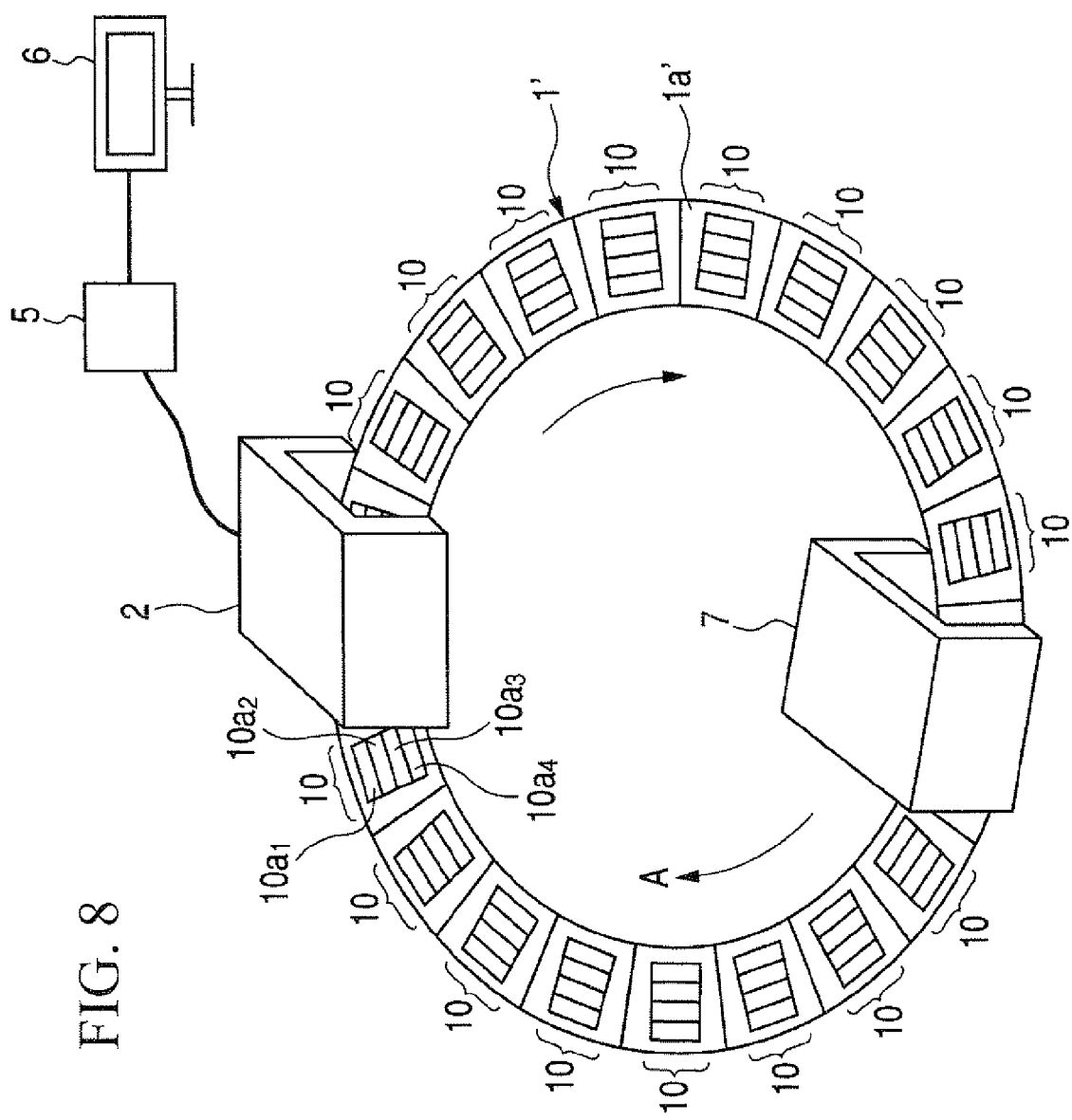
FIG. 8 is an explanatory diagram showing, in outline, the configuration of a virtual-slide specimen image acquisition apparatus according to a third embodiment of the present invention.

FIG. 8 is an explanatory diagram showing, in outline, the configuration of a virtual-slide specimen image acquisition apparatus according to a third embodiment of the present invention. Note that structures that are the same as those in the first embodiment are denoted by the same reference signs, and a detailed description thereof will be omitted.

The virtual-slide specimen image acquisition apparatus of the third embodiment has a conveying device 1' for conveying specimens, an image capturing device 2 for capturing images of specimens magnified to a predetermined magnification, a loading/unloading loader 7 that assumes the function of loading the specimens into the conveying device 1' as well as the function of unloading the specimens from the conveying device 1', a control device 5, and a display device 6.

The conveying device 1' is configured having an annular member 1a' that rotates on a horizontal plane in one rotational direction.

The annular member 1a' has a width on which four slide glass specimens $10a_1, 10a_2, 10a_3,$ and $10a_4$ can be arranged in a direction perpendicular to the conveying direction (arrow A direction), i.e. along the normal line of the annular member 1a' in this case. The four slide glass specimens $10a_1, 10a_2, 10a_3,$ and $10a_4$ constitute a specimen group 10 when placed in a holder (not shown). Further, the annular member 1a' has a length allowing multiple specimen groups 10 to be arranged in the conveying direction.

The loading/unloading loader 7 is configured so as to load the specimen groups 10 placed in the holders (not shown) onto the conveying belt 1a' from one side, while unloading the specimen groups 10, whose images have been acquired, held in the holding portions (not shown) on the conveying belt 1a' at the other side.

Other structures are substantially the same as those of the virtual-slide specimen image acquisition apparatus of the first embodiment or the second embodiment.

With the virtual-slide specimen image acquisition apparatus of the third embodiment, the conveying device can be circulated without providing the conveying device 1' with the holding portions for holding the slide glass specimens. In addition, because disposing a single loader 7, which serves the function of loading the slide glass specimens in the conveying path as well as the function of unloading the slide glass specimens from the conveying path, on the conveying path of the conveying device is sufficient for loading and unloading the slide glass specimens, the overall structure of the virtual-slide specimen image acquisition apparatus can be simplified.

The effects and advantages afforded thereby are substantially the same as those of the virtual-slide specimen image acquisition apparatus of the first and second embodiments.

Although the embodiments of the virtual-slide specimen image acquisition apparatus of the present invention have been described as above, the virtual-slide specimen image acquisition apparatus of the present invention is not limited to the embodiments described above, and any configuration is possible, for example, one in which structures unique to the individual embodiments are combined, etc., so long as configurational prerequisites of the present invention are satisfied.

The virtual-slide specimen image acquisition apparatus of the present invention is effective in the fields of medicine and medical science where pathological diagnosis are performed using virtual slides.

What is claimed is:

1. A virtual-slide specimen image acquisition apparatus that captures images of a specimen on a slide glass by dividing the specimen into a plurality of sections, comprising:

a conveying device on which a plurality of slide glasses can be arranged and that conveys the plurality of arranged slide glasses in a first direction by a distance corresponding to the length of a side along the first direction in one of the divided sections and at first time intervals, the plurality of slide glasses being disposed adjacent to each other on the conveying device at least in a direction perpendicular to the first direction; and an image capturing device that has an image capturing portion for capturing images of the specimens magnified at a predetermined magnification and that scans the slide glasses conveyed to a predetermined position in a second direction, by a predetermined length and at second time intervals, such that the image capturing portion captures images of all sections that are positioned identically in the first direction and that are positioned differently in the second direction perpendicular to the first direction.

2. The virtual-slide specimen image acquisition apparatus according to claim 1, wherein the conveying device is configured such that a plurality of the as slide glasses can be arranged thereon in the second direction, and the image capturing portion scans the slide glasses conveyed to the predetermined position so as to simultaneously capture images of all sections that are positioned identically in the first direction and that are positioned differently in the second direction.

3. The virtual-slide specimen image acquisition apparatus according to claim 2, wherein the conveying device is configured such that a plurality of the slide glasses can be arranged in the first direction.

4. The virtual-slide specimen image acquisition apparatus according to claim 1, wherein the conveying device is configured to circulate to be conveyable in the first direction.

5. The virtual-slide specimen image acquisition apparatus according to claim 1, wherein the conveying device comprises a belt conveyer having a circular belt and two conveying shafts that convey the circular belt.

6. The virtual-slide specimen image acquisition apparatus according to claim 5, wherein the circular belt has holding portions that support the specimens.

7. The virtual-slide specimen image acquisition apparatus according to claim 5, wherein the circular belt is configured so as to be detachable from the conveying shafts.

8. The virtual-slide specimen image acquisition apparatus according to claim 1, wherein the conveying device is configured such that a plurality of the specimens slide glasses can be arranged in the first direction and so as to circulate to be conveyable in the first direction, and the image capturing device is configured such that the image capturing portion captures images of all sections that are positioned identically in the second direction and that are positioned differently in the first direction in the slide glasses conveyed to the predetermined position, and thereafter, relative positions of the image capturing portion and the conveying device are moved towards the next section located in the second direction; and this action is repeated until the image capturing portion captures images of all of the sections of all of the slide glasses arranged on the conveying device.

9. The virtual-slide specimen image acquisition apparatus according to claim 8, wherein the conveying device is further configured such that a plurality of the slide glasses can be arranged in the second direction.

10. The virtual-slide specimen image acquisition apparatus according to claim 1, wherein the conveying device comprises a belt conveyer having a circular belt provided with holding portions for holding the slide glasses and two conveying shafts that convey the circular belt.

11. The virtual-slide specimen image acquisition apparatus according to claim 1, wherein the conveying device comprises an annular member that rotates on a horizontal plane in one rotational direction.

12. The virtual-slide specimen image acquisition apparatus according to claim 1, wherein the conveying device is configured so as to be capable of being disposed with the longitudinal direction of the slide glasses parallel to the first direction.

13. The virtual-slide specimen image acquisition apparatus according to claim 1, wherein the conveying device is configured so as to be capable of being disposed with the longitudinal direction of the slide glasses parallel to the second direction.

14. The virtual-slide specimen image acquisition apparatus according to claim 1, further comprising:

an image storing device that, for every image of a predetermined section of a predetermined specimen captured by the image capturing device, stores the captured image in a predetermined image storing area in association with positional information of the section.

15. A virtual-slide specimen image acquisition apparatus that captures images of a specimen by dividing the specimen into a plurality of sections, comprising:

A conveying device on which a plurality of specimens can be arranged and that conveys the plurality of arranged specimens in a first direction by a distance corresponding to the length of a side along the first direction in one of the divided sections and at first time intervals; and wherein the conveying device comprises a belt conveyer having a circular belt and two conveying shafts that convey the circular belt, and an image capturing device that has an image capturing portion for capturing images of the specimens magnified at a predetermined magnification and that scans the specimens conveyed to a predetermined position in a second direction, by a predetermined length and at second time intervals, such that the image capturing portion captures images of all sections that are positioned identically in the first direction and that are positioned differently in the second direction perpendicular to the first direction.

16. A virtual-slide specimen image acquisition apparatus that captures images of a specimen by dividing the specimen into a plurality of sections, comprising:

a conveying device on which a plurality of specimens can be arranged and that conveys the plurality of arranged specimens in a first direction by a distance corresponding to the length of a side along the first direction in one of the divided sections and at first time intervals; and wherein the conveying device comprises a belt conveyer having a circular belt provided with holding portions for holding the specimens and two conveying shafts that convey the circular belt, and an image capturing device that has an image capturing portion for capturing images of the specimens magnified at a predetermined magnification and that scans the specimens conveyed to a predetermined position in a second direction, by a predetermined length and at second time intervals, such that the image capturing portion captures images of all sections that are positioned identically in the first direction and that are positioned differently in the second direction perpendicular to the first direction.

17. A virtual-slide specimen image acquisition apparatus that captures images of a specimen by dividing the specimen into a plurality of sections, comprising:

a conveying device on which a plurality of specimens can be arranged and that conveys the plurality of arranged specimens in a first direction by a distance corresponding to the length of a side along the first direction in one of the divided sections and at first time intervals and wherein the conveying device comprises a belt conveyer having a circular belt and two conveying shafts that convey the circular belt and wherein the circular belt is configured so as to be detachable from the conveying shafts;

and an image capturing device that has an image capturing portion for capturing images of the specimens magnified at a predetermined magnification and that scans the specimens conveyed to a predetermined position in a second direction, by a predetermined length and at second time intervals, such that the image capturing portion captures images of all sections that are positioned identically in the first direction and that are positioned differently in the second direction perpendicular to the first direction.

* * * * *